(12) United States Patent
Srinivasan et al.

(10) Patent No.: US 7,188,163 B2
(45) Date of Patent: Mar. 6, 2007

(54) DYNAMIC RECONFIGURATION OF APPLICATIONS ON A SERVER

(75) Inventors: Arvind Srinivasan, Santa Clara, CA (US); Murthy Chintalapati, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 733 days.

(21) Appl. No.: 09/994,497

(22) Filed: Nov. 26, 2001

(65) Prior Publication Data
US 2003/0101245 A1 May 29, 2003

(51) Int. Cl.
*G06F 15/177* (2006.01)

(52) U.S. Cl. .................. 709/221; 709/220; 717/168; 717/169

(58) Field of Classification Search .......... 709/203, 709/220–222; 717/168–173
See application file for complete search history.

(56) References Cited

U.S. PATENT DOCUMENTS

| | | | |
|---|---|---|---|
| 5,165,018 A | | 11/1992 | Simor |
| 5,659,786 A | | 8/1997 | George et al. |
| 5,682,529 A | | 10/1997 | Hendry et al. |
| 5,727,208 A | * | 3/1998 | Brown ................... 713/100 |
| 5,784,563 A | * | 7/1998 | Marshall et al. ........... 709/221 |
| 5,822,531 A | * | 10/1998 | Gorczyca et al. .......... 709/221 |
| 5,900,871 A | * | 5/1999 | Atkin et al. .............. 715/866 |
| 6,009,274 A | * | 12/1999 | Fletcher et al. ............. 717/173 |
| 6,154,878 A | * | 11/2000 | Saboff .................... 717/173 |
| 6,182,119 B1 | * | 1/2001 | Chu ...................... 709/206 |
| 6,185,734 B1 | * | 2/2001 | Saboff et al. ............. 717/164 |
| 6,195,750 B1 | | 2/2001 | Ellsworth |
| 6,212,585 B1 | | 4/2001 | Chrabaszcz |
| 6,311,232 B1 | | 10/2001 | Cagle et al. |
| 6,314,516 B1 | | 11/2001 | Cagle et al. |
| 6,343,360 B1 | | 1/2002 | Feinleib |
| 6,470,436 B1 | * | 10/2002 | Croft et al. ............... 711/206 |
| 6,513,115 B2 | * | 1/2003 | Nock et al. ............... 713/100 |
| 6,539,381 B1 | * | 3/2003 | Prasad et al. .............. 707/10 |
| 6,622,159 B1 | * | 9/2003 | Chao et al. ............... 709/203 |
| 6,714,949 B1 | * | 3/2004 | Frey, Jr. .................. 707/200 |
| 6,871,344 B2 | * | 3/2005 | Grier et al. ............... 717/162 |
| 6,976,079 B1 | * | 12/2005 | Ferguson et al. .......... 709/229 |
| 2002/0107977 A1 | | 8/2002 | Dunshea et al. |
| 2002/0120724 A1 | | 8/2002 | Kaiser et al. |

OTHER PUBLICATIONS

Anonymous, The Jakarta Project, "Release Notes for: Apache Tomcat Version 3.3,"http://jakarta.apache.org/tomcat/tomcat-3.3-doc/readme, Feb. 14, 2002, pp. 1-8 (Sections 4 and 6.4 Pertinent), printed Mar. 5, 2002.

* cited by examiner

*Primary Examiner*—Ario Etienne
*Assistant Examiner*—LaShonda Jacobs
(74) *Attorney, Agent, or Firm*—Hickman Palermo Truong & Becker LLP; John D. Henkhaus

(57) ABSTRACT

Methods for reconfiguring an application running on a server, without restarting the server, are described. Method steps include reading application configuration information related to a new version of the application, constructing an application configuration based on the application configuration information, and providing the application configuration to the server. Advantageously, an application runtime environment within the server services new application service requests related to the application by referencing the new application configuration, while old application configurations are maintained for servicing, without interruption, existing service requests related to the application.

38 Claims, 6 Drawing Sheets

DYNAMIC RECONFIGURATION OF APPLICATIONS ON A SERVER

CROSS REFERENCE TO RELATED APPLICATION

The present application is related to commonly owned U.S. patent application Ser. No. 09/792,805, now U.S. Pat. No. 6,976,065, entitled "Mechanism for Reconfiguring A Server Without Incurring Server Down Time," filed on Feb. 23, 2001, the content of which is incorporated by reference in its entirety for all purposes as if fully set forth herein.

FIELD OF THE INVENTION

This invention relates generally to computer systems, and more particularly to a technique for enabling server-based applications to be reconfigured without incurring server down time.

BACKGROUND

With the continuing evolution of network computing, distributed applications utilizing a client/server computing model have become quite prevalent. Server-based, or web applications, have become a primary purveyor of distributed computing resources to client users connected to web servers and other servers through a network.

Applications that execute on a server require reloading and reinitialization when the underlying software code is revised or when the application configuration is revised. Furthermore, the server may be in the midst of processing requests on behalf of users for the revised application while the application is being reloaded or reinitialized.

One prior approach to reconfiguring a server-based application upon an application revision is to stop the server from processing, reload the revised application and reconfigure the server accordingly, and then restart the server in order to implement the changes made to the application and the server. This approach has numerous shortcomings, one of which is the fact that the server cannot process requests for the revised application, or any other application installed on the server, while it is off-line or in the process of restarting. Requests that are in progress when the server is restarted may be interrupted, which typically leads to request processing errors. Furthermore, any server down-time adversely affects the availability of the server, which in turn may have an impact on, for example, SLAs (Service Level Agreement) associated with the services provided by the server.

Other shortcomings of this approach are due to the fact that large servers typically have multiple applications executing, thus an application maintenance operation requiring server stop/restart each time an application is changed is not a viable approach for a high-traffic server, partly due to the time it takes to restart a server running multiple applications. Again, while the server is off-line and while being restarted, users may be denied access to the server. A complex server can take on the order of minutes to restart. In terms of request traffic, several minutes is an extremely long time, and a tremendous amount of traffic can be lost in that time. Many servers, such as those servicing commercial websites, cannot afford to have this amount of down time. In addition, discovery of an error in the new application configuration subsequent to the reload requires another server stop/restart. Yet another shortcoming to note is that interrupting requests that are in progress by restarting the server likely compromises the integrity of the data associated with the current user sessions, which leads to errors when the sever resumes its request processing.

Another prior approach to reconfiguring a server-based application is to configure the server to periodically check the application class files for revisions thereto. Using this approach, the timestamp associated with each application class file is stored when starting the server and thus reloading the application. Upon an application service request, the server checks to see if a predetermined time interval has expired, and if it has, the server compares the timestamp of each class file stored on disk with the associated timestamp that the server had when it started. If the two timestamps are different, then the application class files are reloaded to ensure the that the current version of the application is being used to process requests.

This approach also has numerous shortcomings, one of which is that changes to the application configuration files, which are key application components, are not detected. This approach only detects changes to the application code, for example, the Java source code that is compiled into the application class files. Furthermore, any changes to the container, or runtime environment, in which the application is running, are also not detected. This is a bad situation because, typically, configuration changes to a container which directly or indirectly affect the application must cause the application to be reloaded and reinitialized so that the configuration used by the server reflects the current configuration of the application and the container. This approach does not facilitate such a process. Another shortcoming to this prior approach is that a server administrator typically waits for the predetermined time to elapse, and thus changes to the application are not detected until expiration of the time interval. Hence, one might have to wait to verify that the revised application is executing and functioning properly. Yet another shortcoming is that each time the periodic check is performed, it produces a negative impact on server performance.

The current methodology for reconfiguring a server leaves much to be desired. In light of the foregoing, there is a clear need for an improved server-based application reconfiguration mechanism.

SUMMARY OF THE INVENTION

In light of the shortcomings discussed above, the present invention provides an improved mechanism for reconfiguring an application that runs on a server, which enables the application to be reconfigured without incurring server down time and without interrupting application service requests or losing data associated with existing user sessions.

A method for reconfiguring an application running on a server, without restarting the server, include steps of reading application configuration information related to a new version of the application, constructing an application configuration based on the application configuration information, and providing the application configuration to the server. Advantageously, an application runtime environment within the server services new application service requests received on a new connection by referencing the new application configuration, while old application configurations are maintained for servicing, without interruption, existing service requests received on an existing connection.

According to one embodiment, the server determines whether the new application configuration has successfully initialized by receiving an indication from the runtime environment after consideration to the new application configuration, prior to changing a pointer to the revised application configuration in order to process requests on new connections. In another embodiment, persistent session information related to existing application user sessions is accessed to use in servicing new requests from the same user during the same user session.

As part of a server reconfiguration process, generally, server-based application reconfiguration is implemented as follows. At system startup, a server process is instantiated (the terms server and server process will be used interchangeably herein), and based upon a set of configuration information, the server constructs a set of runtime configuration data structures, including application configurations for applications installed on the server. These data structures are stored in a portion of the server process's memory space, and a reference or pointer to that portion of the memory space is stored in a global variable.

Once constructed, the configuration data structures are used to process incoming service requests. More specifically, in one embodiment, the server receives a request from a client for an application service. In providing the service, the server consults the global variable to obtain the pointer to the configuration data structures, and associates that pointer with the server connection, and thus the user session. Thereafter, all requests, events, and activities related to that application are processed by the server in accordance with the configuration data structures.

At some point, the application configuration information is revised (e.g. by an application developer) and the server receives a signal to reconfigure itself in accordance with the revised application configuration information. In response to this signal, the server constructs a new set of runtime configuration data structures based upon the modified application configuration information. In one embodiment, the server constructs the new data structures in much the same way as it did the first set of data structures, except that the new data structures are not constructed as part of a startup procedure, but rather in the background while continuing to process service requests. Thus, to construct the new data structures, the server does not need to be shut down and restarted.

While the server is constructing the new set of data structures, the global variable continues to store a pointer to the first set of data structures; hence, all connections established by the server while the new data structures are being constructed are associated with the first set of data structures. Consequently, all requests, events, and activities received on those connections, including those related to the application, are processed by the server in accordance with the first set of data structures.

Once the new configuration data structures are constructed and stored by the server into another portion of the server process's memory space, the pointer value in the global variable is updated atomically. More specifically, the server changes the pointer value in the global variable such that it points to the new set of data structures rather than the first set of data structures. By doing so, the server in effect changes its configuration, thus changing the application configuration to the revised version of the application. That is, by changing the pointer in the global variable, the server causes all future application service requests received on new connections to be associated with the new set of data structures rather than the first set. This in turn causes all requests, events, and activities on those future service requests to be processed in accordance with the new data structures. Since the new data structures reflect the revised application configuration information, switching to the new data structures has the effect of reconfiguring the application. Pending service requests or new service requests on an old connection are still processed according to the first set of data structures. In this manner, a smooth transition from the old application configuration to the new application configuration is achieved.

By eliminating the need for server down time, the present invention overcomes the shortcomings of the current methodology, and provides a significant advance in the art.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF
EMBODIMENT(S)

Functional Overview of Server Reconfiguration

Figure 1A:
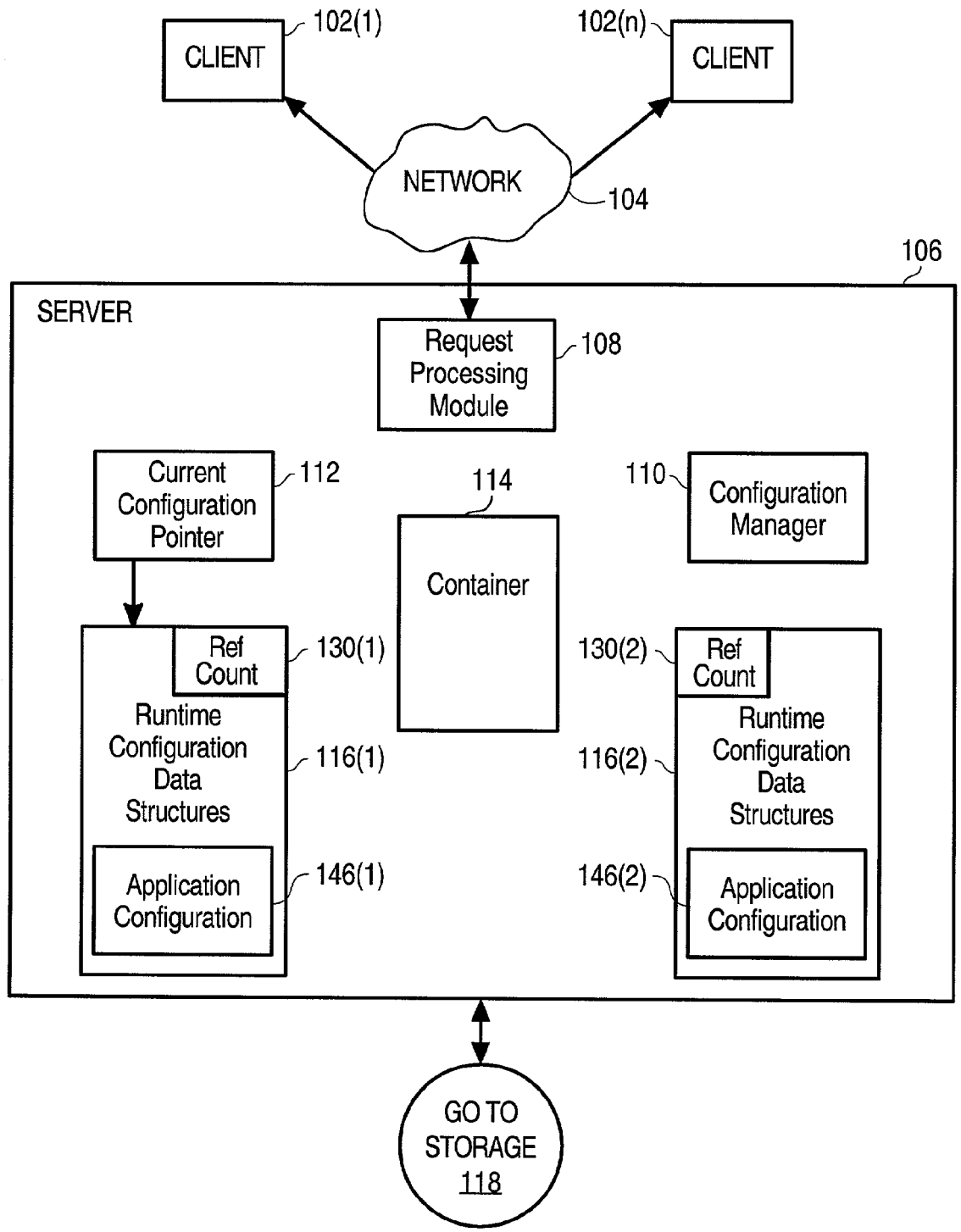
FIG. 1A is a partial block diagram illustrating a system in which an aspects of the present invention may be implemented.
Figure 1B:
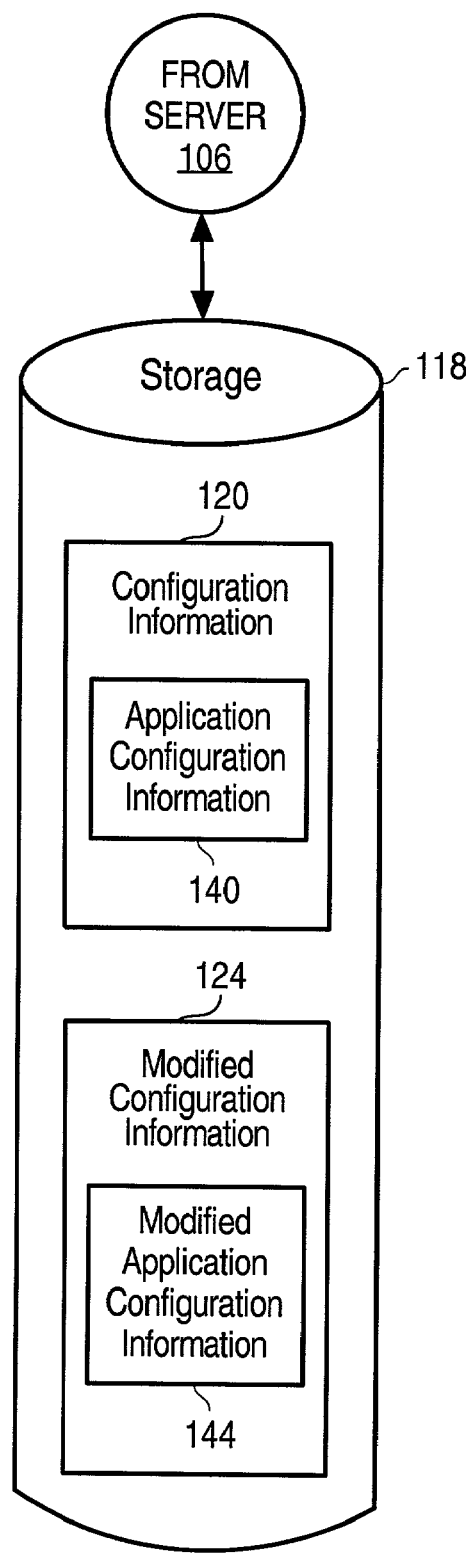
FIG. 1B is a partial block diagram continuing from FIG. 1A, illustrating a system in which an aspects of the present invention may be implemented.

FIGS. 1A and 1B are block diagrams of a system 100 in which one embodiment of the present invention may be implemented, the system comprising a plurality of clients 102, a network 104, a server 106, and a storage 118. For purposes of illustration, the invention will be described below with reference to a web server 106. However, it should be noted that the invention is not so limited. Rather, the invention may be implemented in any type of server or computer system in which configuration information is used to define the behavior of a server and of an application that executes on the server.

As used herein, the term configuration information refers broadly to any information that defines the behavior of a server, and that is used by the server to determine its operation or behavior at runtime. Examples of configuration information include but are not limited to: (1) virtual server definitions, including the definition of virtual server addresses, the mapping of domain names to IP addresses, and the specification of connections between certain sockets and certain virtual servers; (2) access control and security information that specifies, for example, which entities are allowed to access which resources; (3) resource management information, such as how many threads (e.g. acceptor threads) are to be allocated at system startup; (4) information specifying how requests are to be processed, such as which application is to be invoked in response to a particular URL; (5) information specifying a source for content, such as the root directory for a particular domain name; (6) secure socket layer configuration information, such as the ciphers that are used to establish a connection and the digital certificates that are used to certify authenticity of important materials; and (7) application configuration information, such as deployment descriptor information, application classes, and archive file libraries. These and other types of information may be specified as configuration information. In one aspect, the present invention is directed to application configuration information, and techniques for updating such information.

In system 100, each of the clients 102 may be any mechanism capable of communicating with the server 106, including but not limited to a computer running a browser program. The client 102 may communicate with the server 106 using any known protocol, including but not limited to HTTP and FTP, and the client 102 communicates with the server 106 via the network 104. The network 104 may be any type of network, including but not limited to a local area network and a wide area network such as the Internet. The network 104 may even be as simple as a direct connection. Any mechanism capable of facilitating communication between the client 102 and the server 106 may serve as the network 104.

In system 100, the server 106 is the mechanism responsible for providing most of the functionality of the system 100. More specifically, the server 106 receives application service requests from the clients 102, and performs whatever operations are necessary to service the requests. In one embodiment, the mechanism responsible for servicing client requests is the request processing module 108. Among other functions, the request processing module 108 establishes connections with the clients 102, and processes whatever requests, events, and activities are received on those connections. In carrying out its functions, the request processing module 108 relies upon several sets of information, including a pointer 112, which points to the current set of runtime configuration data structures 116(1), including the application configuration 146(1). The pointer 112, which in one embodiment is stored as a global variable, enables the request processing module 108 to access the current set of configuration data structures 116(1), and the data structures 116(1) identify to the request processing module 108 the configuration information that a container 114 uses to load and execute an application to process and respond to client requests. As will be explained in greater detail below, the container 114 relies on application configuration information 146 constituent to the configuration data structures 116 to run the requested application.

In addition to the request processing module 108, the server 106 further comprises a configuration manager 110. In one embodiment, it is the configuration manager 110 that constructs and maintains the runtime configuration data structures 116 and the pointer 112. The configuration manager 110 manages the data structures 116 and the pointer 112 at system startup time, upon a system reconfiguration request, and during normal operation.

More specifically, at system startup time, the configuration manager 110 constructs the initial set of runtime configuration data structures 116(1) based upon the configuration information 120 stored in the storage 118. The configuration data structures 116(1) are effectively an internal server representation of the configuration information 120. These data structures 116(1) are easy and convenient for the request processing module 108 to access and to manipulate at runtime. Once constructed, the configuration data structures 116(1) may be used by the server 106 to determine its behavior at runtime. In addition, container 114 utilizes application configuration information 146(1) to determine, locate, and apply executable application components for servicing requests. To enable the request processing module 108 to access the initial set of data structures 116(1), the configuration manager 110 updates the pointer 112 to point to the data structures 116(1). Initial setup of the application's configuration is thus achieved.

During normal operation, the configuration manager 110 may receive a signal (e.g., from a system administrator or application developer) to reconfigure the server 106. More specifically, the configuration manager 110 may receive a signal to construct a new set of runtime configuration data structures based upon a modified set of configuration information 124. The modified set of configuration information 124 may comprise modified application configuration information 144 for applications deployed on the server 106. In response to such a signal, the configuration manager 110 accesses the set of modified configuration information 124 from the storage 118, and constructs a new set of runtime configuration data structures 116(2) based upon the modified configuration information 124. After the new data structures 116(2) are fully constructed, the configuration manager 110 updates the current configuration pointer 112 to point to the new set of configuration data structures 116(2) instead of the initial set of data structures 116(1). Hence, listener threads that are accepting new application service requests are then directed to the new set of configuration data structures 116(2), which in turn direct worker threads to execute the application of interest according to the current data structures 116(2). In one embodiment, this update operation is performed atomically (e.g. by using a lock) to prevent errors that may arise from other threads accessing the pointer 112 while it is being updated.

The container 114 provides the runtime environment for running applications on the server 106. In other words, it provides the resources, or at least access to the resources, required to process application service requests. By updating the current configuration pointer 112, the configuration manager 110 causes all server components (including the request processing module 108 and the container 114) that rely upon the pointer 112, to access the new data structures 116(2) instead of the initial set of data structures 116(2). By changing the pointer 112, thereby changing the set of configuration data structures the container 114 relies upon to run a particular application, the configuration manager 110 in effect changes the configuration of the applications running on the server 106. As will be described in greater detail in a later section, reconfiguring the server 106 in this manner causes the request processing module 108 to associate future connections with the new data structures 116(2) rather than the initial set of data structures 116(1).

Several points should be noted at this juncture. First, note that in constructing the new runtime configuration data structures 116(2), the server 106 does not need to be shut down and restarted. Rather, the configuration manager 110 constructs the new data structures 116(2) as part of its normal operation. In addition, note that at certain points in time, there may be more than one set of runtime configuration data structures 116 used by the container 114. Hence, some application service requests, such as requests pending on an existing connection at the time of reconfiguring the server, may be processed using one or more sets of configuration data structures (e.g., 116(1) and 146(1)), while new requests received on a new connection may be processed using another set of configuration data structures (e.g., 116(2) and 146(2)). Server 106 allows for this possibility. In fact, this aspect of the server 106 enables a smooth transition to be achieved from one application configuration to another. In FIG. 1A, for the sake of simplicity, only two configuration data structures 116 are shown. It should be noted, though, that any number of configuration data structures 116, and thus application configuration information 146, may exist in the server's memory space at any time.

In one embodiment, the server 106 is implemented in a multi-threaded environment. In such an environment, the request processing module 108 and the configuration manager 110 may be running on different threads, which means that they may run concurrently. As a result, while the configuration manager 110 is constructing a new set of configuration data structures 116(2), the request processing module 108 may continue to receive connection requests and application service requests. The resultant connections and service responses will be associated with the initial set of configuration data structures 116(1), until the current configuration pointer 112 is updated to point to the new set of configuration data structures 116(2). Until this time, the new data structures 116(2) are not used by the request processing module 108 or any other server component. This helps to prevent errors and to facilitate a smooth transition from one configuration to another.

Functional Overview of Application Reconfiguration

Methods for reconfiguring an application executing on a computer system without restarting the computer system are described. In one embodiment, implementations of the methods involve web applications running on a web or application server.

Referring again to FIGS. 1A and 1B, configuration information 120 and modified configuration information 124 include application configuration information 140 and modified application configuration information 144, respectively. Both application configurations 140 and 144 comprise information used to execute applications on the server 106.

Figure 1C:
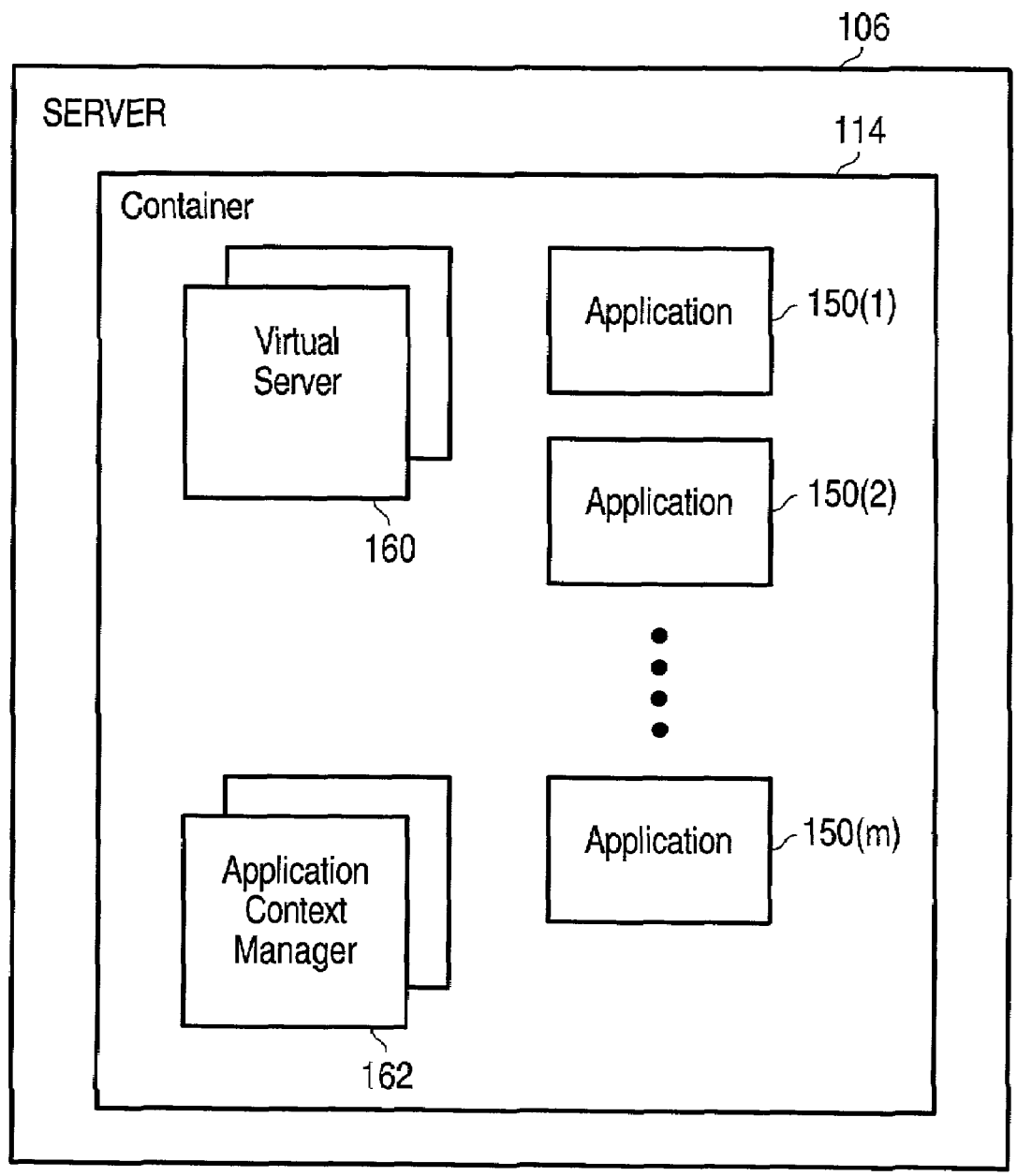
FIG. 1C is a block diagram illustrating an architecture of a server on which aspects of the present invention may be implemented.

FIG. 1C is a block diagram illustrating an architecture of a server 106 on which aspects of the present invention may be implemented. For example, the server 106 may be an application server such as an iPlanet™ Application Server, or a web server such as an iPlanet™ Web Server, both available from Sun Microsystems, Inc. of Palo Alto, Calif. The server 106 includes a container 114, which provides a runtime environment for executing application components. A virtual server 160 is typically implemented to run applications for a specific customer or user, or to support a specific e-commerce or application web site, and operates as a configurable, stand-alone server from the user's viewpoint. Each virtual server 160 can interoperate with more than one application context manager 162, whereby each application context manager 162 facilitates the execution of a single application.

Container 114 at times contains applications which are running therein, such as applications 150(1) through 150(m) (sometimes referred to collectively herein as applications 150). Applications 150 are any applications that are configured to run on server 106. For example, applications 150 may be servlets using Java™ Servlet technology, which are platform-independent classes in the Java programming language compiled to a byte-code that can be dynamically loaded into and run by a server such as server 106. Servlets are managed by the container 114 to generate dynamic content in response to client user interaction therewith. The user interactions are referred to as application service requests, or simply service requests or requests. Although embodiments of the invention are described herein as implementations using servlets as application components, practice of the invention is not limited to use with servlets, for the techniques described may apply to other types of server-based applications.

Container 114, in conjunction with server 106, provides the services over which application requests are met and responses provided. Additionally, container 114 contains and manages application components, such as servlets. Container 114 can be built into a server 106, such as a web server or application server, or installed as an add-on component to a server via an API (Application Program Interface). In one embodiment, container 114 supports HTTP as a request and response protocol, and may additionally support other protocols such as HTTPS (HTTP over SSL). Container 114 provides an environment for running applications, that is, it provides the infrastructure, resources, and external resource interface modules that an application requires to execute properly. For example, the container 114 can load the applicable application classes for instantiating and executing a requested application service; it can load database drivers upon an application making a database service request; and it can maintain and administer user sessions during execution of an application. Container 114 may be embodied in a module such as a Java Virtual Machine, but it is not so limited.

Once a user requests an application service, typically by invoking a Uniform Resource Locator (URL) through a web browser program, the server 106 identifies the requested application by mapping the URL to an application context. For example, consider the following URL: http://server.com/catalog/shoppingservlet. The "server.com" portion of the URL maps to a virtual server 160. The "catalog" portion of the URL is a context path which maps to an application named "catalog." The "shoppingservlet" portion of the URL is a URI (Uniform Resource Identifier), and maps to an application component named "shoppingservlet." Once the server 106 resolves the URL to the appropriate application context, it can direct the container 114 to service the request, i.e., to invoke the application component identified in the URI. Thus, from the mapped request passed from the server 106, the application context manager 162 has the necessary information to deploy an instance of the application.

In general, at the server 106, a listener thread receives a service request, and establishes a connection with a container 114. The listener thread queues the connections, with associated runtime configuration data structures 116 (which may be encapsulated in a configuration object embedded in a server connection object), for passing to worker threads that service the connection. The worker threads are capable of processing whatever requests, events, and activities are received on those connections, and utilize the connection object and the associated configuration object for processing. For example, a worker thread works with the server 106 to identify to which virtual server a particular service request belongs, and works with the container 114 to invoke the application service logic, which in turn determines whether the applicable application components (e.g., servlets) are loaded and whether the application class files are current or require reloading. The term thread is used herein to describe the processing resources used to execute a series of instructions embodied in software code.

As part of a server 106 start-up process, each container 114 associated with a server 106 instance is initialized. As part of the container 114 initialization process, for each virtual server 160 associated with a particular container 114, a list of applications is accessed to determine whether the virtual server 160 has any applications 150 configured thereon. For each application 150 found on the list, an application-specific configuration information file is read to determine the current configuration for the application 150. Furthermore, the applications 150 are loaded into the container 114. If the applications 150 load successfully, then a server 106 configuration object (e.g., data structures 116) is denoted as the current configuration, to which subsequent service requests will reference. As part of a server 106 reconfiguration process, the container 114 accesses the list of applications 150 and associated current application configuration information files that are constituent to a new server 106 configuration, which may contain application configurations for new versions of applications. Through the server reconfiguration process, applications 150 executing thereon are reconfigured to their latest version, without requiring a server 106 restart, without interrupting any pending application service requests, and without requiring establishment of any additional user sessions.

Application Configuration

Applications that execute on a server, such as applications 150, are often referred to as web applications in the context of a WAN such as the Internet, and can be referred to as network or distributed applications in the context of a LAN such as an intranet or enterprise network. Herein, such an application will be referred to simply as "application." An application 150 may comprise a collection of servlets, utility classes, JavaServer Pages™ (JSP), HTML pages, GIFs (Graphics Interchange Format), and other resources that can be run in multiple containers 114 on multiple servers 106. An application 150 is rooted at a specific context path within a server 106, through which all requests appropriately referencing the path will be routed in order to request the service offered by the application 150.

A JSP utilizes an extension of the servlet technology to support authoring of HTML and XML pages, making it easier to combine fixed or static template data with dynamic content. JSPs are often used as the front end to a back end servlet, both running on a server such as server 106, to present information to a user wherein the dynamic information is typically provided by the servlet.

An application 150 exists as a hierarchically organized set of directories. A special directory, named "WEB-INF", exists within the application hierarchy and contains all things related to the application that are not in the application document root. Furthermore, no files in the WEB-INF directory are part of the public document tree, thus they can not be served directly to a client. A WEB-INF directory comprises the following:

(1) a deployment descriptor (web.xml), which is read by a container 114 for loading the appropriate servlets and executing the application;

(2) a class directory (classes/*) for servlet and utility classes, which is used by an application class loader to load classes; and (3) a library of archive files (lib/*.jar) for Java Archive files that contain servlets, beans, and other utility classes useful to the application 150, the files which are used by the application class loader to load classes. Applications 150 can be packaged into a Web Archive (.war) format.

The following types of configuration and deployment information typically exist in the application deployment descriptor, but are not limited thereto:

(1) servletContext initialization parameters, which declare the application's servlet context initialization parameters and associated values;

(2) session configuration, which defines the session parameters for the application;

(3) servlet/jsp definitions, which declare servlet data, such as the canonical name and the fully qualified class name of the servlets;

(4) servlet/jsp mappings, which define mappings between servlets and a URL pattern;

(5) MIME type mappings, which define mappings between an extension (e.g., "txt") and a MIME type (e.g., "text/plain");

(6) Welcome file list, which contains an ordered list of welcome file elements;

(7) error pages, which defines mappings between error codes or exception types to the path of an application resource; and (8) security, which defines various security configurations.

These and other elements of an application deployment descriptor are described in Java™ Servlet Specification (Version 2.2), published by Sun Microsystems, Inc., which are included as part of a configuration object utilized by the container 114 to execute an application.

Generally, an application developer may modify the application code, configuration, or external class references in reconfiguring an application. Furthermore, any of the aforementioned information elements, among others, can be modified by an application developer, thus reconfiguring an application and necessitating a server reconfiguration operation in order to implement the changes on the server on which the application executes. In addition, a change to the container 114 in which an application runs can also trigger a server reconfiguration operation in order to reconfigure the container 114 as well as the applications 150 which rely on the container 114 for execution. Any changes to static content, such as GIFs or HTML pages, do not trigger a reconfiguration operation.

Application Reconfiguration Process

In general, the server-based application reconfiguration techniques described herein accept a reconfiguration request, build in the background new application configuration files based on new application configuration information, exchange configuration files at an appropriate time, and manage multiple configurations such that pending requests on existing connections are completed using old configurations on which they previously relied and new requests on new connections are serviced using the new configuration.

Typically, when a server 106 is initializing either at startup or reconfiguration, the server 106 reads main configuration files and builds lists of ports, virtual servers, SSL certificates, and the like. The reconfiguration process can be initiated with a command or message sent to the server 106 across a socket specified as an administration channel, where it is received and processed by a listener thread. In an implementation in which the server is running a UNIX operating system, a UNIX domain socket is used. In an implementation in which the server is running Microsoft NT, a service channel is used. In each case, the reconfiguration message is received by the server without impacting or interrupting current processing. While building the configuration, the server 106 reads document directories, including application directories such as WEB-INF.

As mentioned, an application 150 can be reconfigured on a server 106 through initialization of a container 114, which in one embodiment, is a sub-process to the overall server 106 reconfiguration process described above and in U.S. patent application Ser. No. 09/792,805 entitled "Mechanism for Reconfiguring A Server Without Incurring Server Down Time."

Figure 2A:
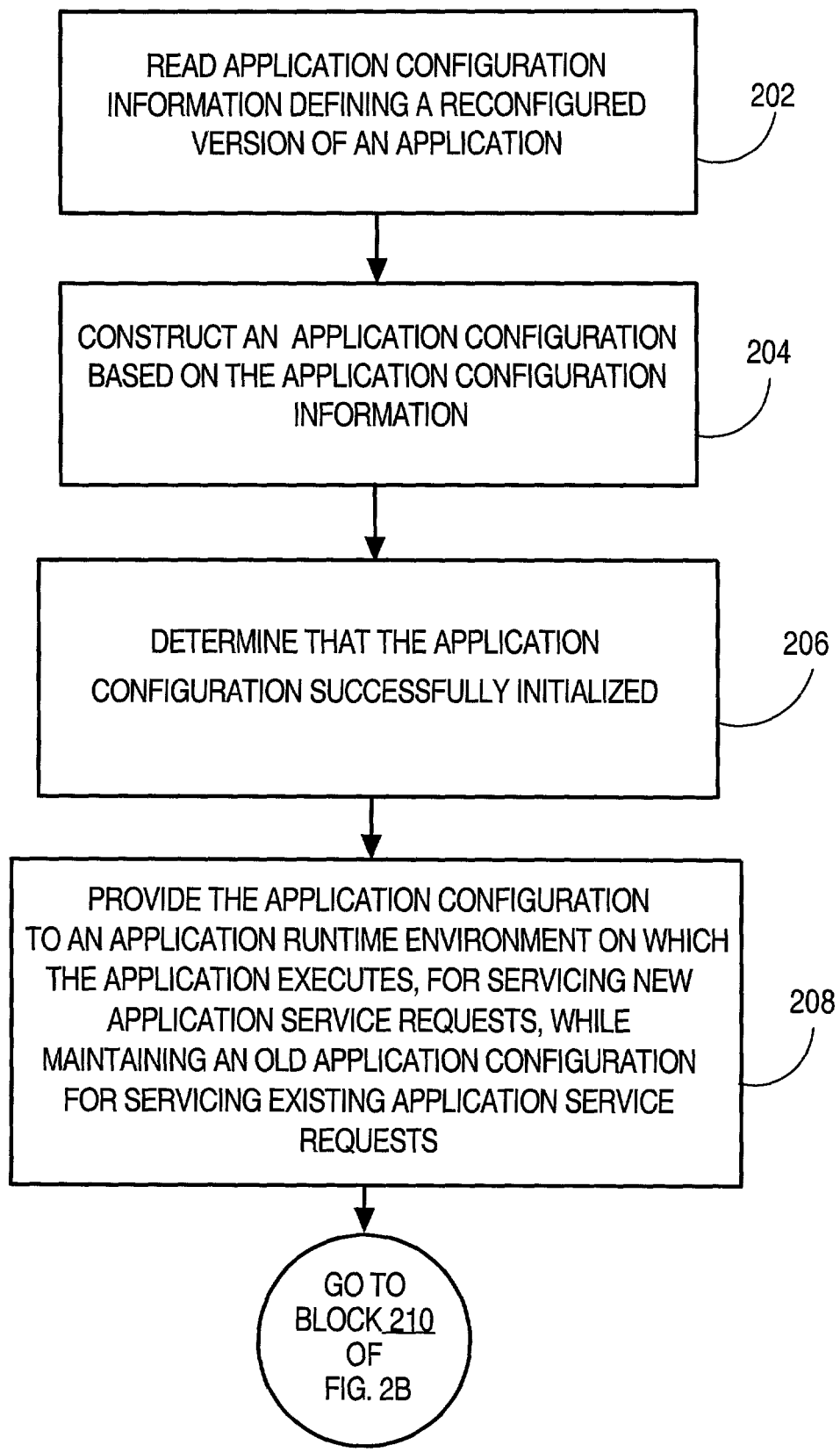
FIG. 2A is a partial flowchart illustrating a method for reconfiguring an application that executes on a server or other computer system without restarting the server/computer system.
Figure 2B:
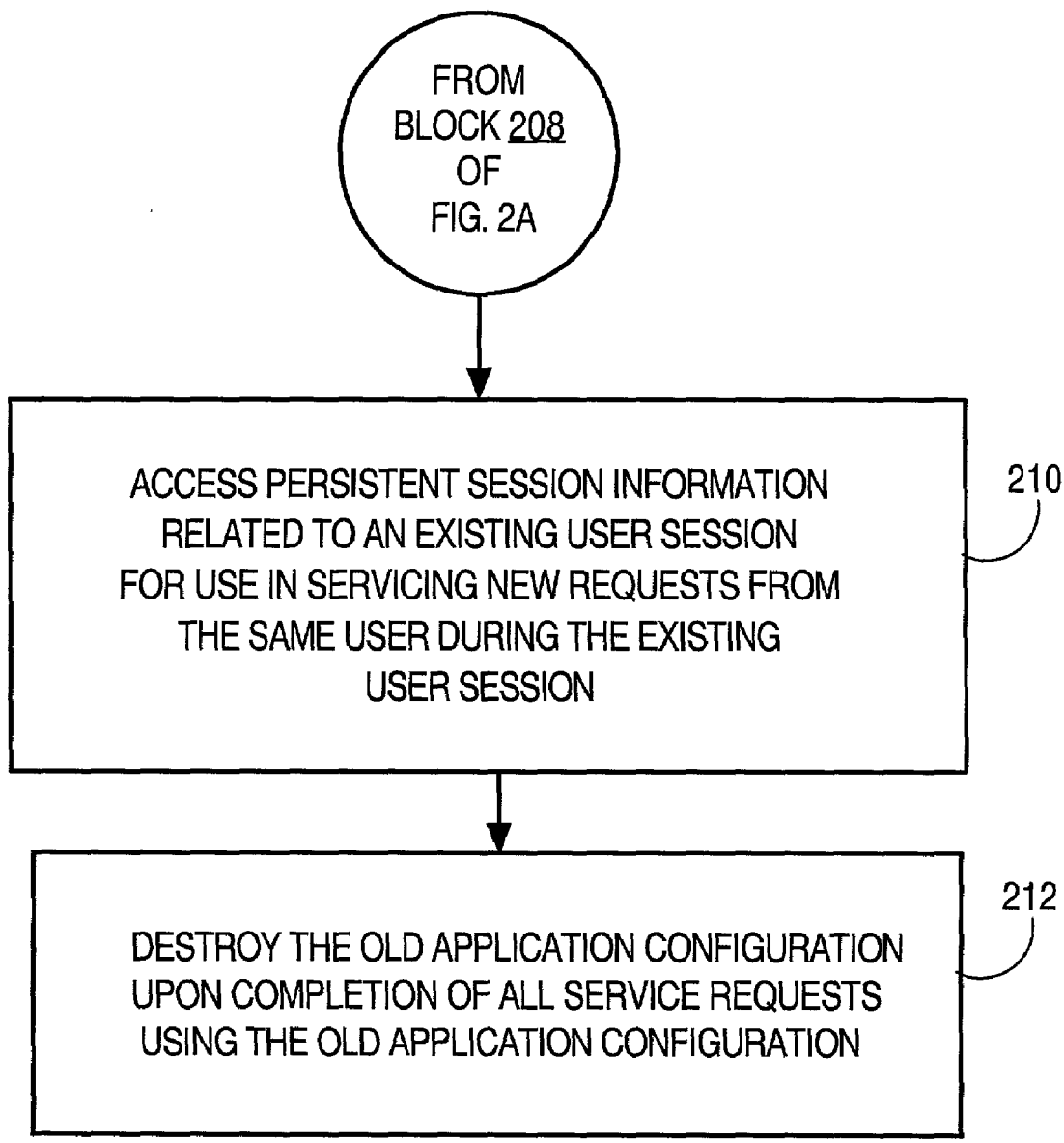
FIG. 2B is a partial flowchart, continuing from FIG. 2A, illustrating a method for reconfiguring an application that executes on a server or other computer system without restarting the server/computer system.

FIGS. 2A and 2B are flowcharts illustrating a method for reconfiguring an application that executes on a server or other computer system without restarting the server/computer system.

At step 202, application configuration information defining a reconfigured version of an application 150 is read from storage. This process can be initiated, for example, by a server reconfiguration request or an application reconfiguration request received over an administration channel or via a command line utility. In addition, an application reconfiguration request can be made and processed without any changes to the server 106 configuration, that is with application changes only. In one embodiment, during installation and initialization of an application in container 114, a server reconfiguration request can be propagated up to the server processes from the container 114, essentially requesting the server 106 reconfigure itself. Resultantly, the container 114 and the application 150 are reconfigured. This reconfiguration request process facilitates monitoring the impact of installing a new application configuration on an operating server 106.

The server 106 can also be reconfigured repeatedly and in quick succession, without affecting the functionality of the server 106. The server 106 monitors and maintains older server configurations, including application configurations, that are processing pending requests and does not delete an older configuration until all request processing relying on the older configuration has completed.

The application configuration information that defines an application includes at least some of the information in the WEB-INF file (or a similar file), primarily from the web.xml file, as described above. Other information contributing to proper execution of an application, not described above, may also be considered configuration information and still fall within the scope of the present invention. A configuration object encapsulating the configuration generally includes the application classes and other resources, or at least directions to the resources, that an application needs to execute properly.

An application configuration based on the application configuration information is constructed, at block 204. Each application configuration is associated with at least one server 106 configuration object. Note that an application configuration may be associated with more than one server 106 configuration object. The server 106 is capable of detecting changes to application configuration files, such as those in WEB-INF. For example, the server 106 can read the timestamps associated with application configuration files as stored, to determine, by comparing with other timestamps stored in the current server 106 configuration, whether the stored application is different than the version of the application as currently configured in the server 106 configuration object. Furthermore, the configuration attributes of an application are constructed based on values in an application configuration file as well as based on the configuration of the container 114. That is, changes to a container 114 in which an application runs inherently also affect the configuration of the application itself. In one embodiment, changes to both the application 150 and the container 114 are considered when constructing an application configuration.

In a related embodiment, a mechanism is provided for detecting when application class files are revised. The last modified time of each class file in an application configuration is stored and when a request for a web application is received, the last modified time is compared to the timestamp stored in the application configuration. If the last modified timestamp is more recent than the configuration timestamp, then the class file is reloaded into the container 114 for execution.

Referring back to FIG. 2A, at block 206, after constructing an application configuration based on the reconfigured version of the application, the server 106 (FIG. 1) determines whether the reconfigured version of that application successfully initialized. The server 106 relies on its components, such as container 114, to determine that the reconfigured version of the application successfully initialized since the container 114 reads the application configuration and loads the application. Note that the server 106 has not yet changed the current configuration pointer 112 (FIG. 1A) to reference the new application configuration, and does not change the pointer 112 to reference the new configuration until its initialization has been verified. Thus, new application service requests are not directed to the new configuration until it is determined that the application initialized properly, so all pending requests continue to be serviced using the current application configuration.

If the reconfigured application results in errors in the container 114, the reconfiguration is rejected and consequently the application is not installed in the server 106 and the error is not propagated throughout the server 106. This is advantageous in that a situation in which an application does not operate properly and thus stops processing, due to installation of corrupted files, is avoided. Furthermore, this feature avoids having to restart and reinitialize the server 106 and reinitialize the container 114 due to corrupted application or application configuration files. Note that the particular application configuration associated with the application with errors is rejected, but other applications that may be reconfigured as part of the same server 106 reconfiguration process may still be installed if no related errors are encountered.

At block 208, the application configuration is provided to server 106 or other computer system on which the application is installed, for servicing new application service requests coming from new connections, while maintaining one or more old application configurations for servicing pending service requests from existing connections. As such, during a server 106 reconfiguration operation, the existing application objects and their associated configuration objects are not changed. Rather, a separate set of objects is constructed to represent the reconfigured version of the application and its configuration. Once the new configuration is ready to be installed in the running server 106, it is defined as the "current" configuration, while the configuration that it replaced is marked as "old." This occurs through redirecting the current configuration pointer 112 to point to the current configuration. Note that web browsers differ as to whether they maintain a connection for multiple client requests. For a browser that maintains a single connection throughout a user session, the new configuration would not be utilized for that session, and new requests would be processed referencing the old configuration even after the pointer 112 is redirected. For a browser that establishes a new connection for each request of a user session, the new configuration would be utilized upon establishment of the next new connection pursuant to a user service request subsequent to the pointer redirection.

In one embodiment, messages related to the initialization of the new configuration are logged, so that a user can track any problems that may occur during the application reconfiguration process. In another embodiment, the logged messages are displayed on a display device so that a user can track any problems in real-time while the reconfiguration process is executing.

At block 210 of FIG. 2B, persistent session information related to existing user sessions is accessed so that new service requests from the same user and for the same application can use the existing session information. The session information is "copied" to, or associated with, the new version of the application through a pointer that references the area of memory on which the session information is stored. Thus, a new session need not be started, and a user does not have to redo whatever has already been done. For example, if an e-commerce "shopping cart" had items in it prior to an application reconfiguration, the shopping cart does not need to be reloaded with the items because the session information is stored in a persistent manner, for example, on a disk or in a database. Therefore, data consistency is maintained across application reconfigurations.

Finally, at block 212, old application configurations are destroyed upon completion of all service requests that are using a particular old configuration, thereby freeing computing resources. For example, the memory blocks which are used to store the old configuration are released for other uses. In one embodiment, determining whether a particular application configuration is referenced by a pending request comprises determining whether a reference count associated with the old server configuration is equal to a predetermined value. For example, a counter can be maintained for a server configuration whereby each request referencing that configuration causes the counter to be incremented, whereas completion of each request referencing that configuration causes the counter to be decremented. Therefore, the counter reaching zero would indicate that no connections or processes are currently referencing the configuration, and consequently no application service requests, and the configuration can be deleted. The example presented is a simplified example, for other actions may affect the counter in addition to requests started and requests completed.

Note that the lifecycle of the application is tied to the underlying server configuration. Hence, when a server is reconfigured, it has associated with it a set of applications, and although the applications may be identical to the previous versions of the applications, the memory used to store the revised application configurations is separate from the memory used to store the previous or old application configurations.

Configuration Manager

As noted previously, it is the configuration manager 110 (FIG. 1A) that is responsible for constructing and maintaining the configuration data structures 116 (FIG. 1A) and the current configuration pointer 112 (FIG. 1A). Operation of the configuration manager 116 begins at system startup. More specifically, the configuration manager 110 is instantiated at startup time, and once instantiated, it proceeds to construct an initial set of configuration data structures 116(1). In doing so, the configuration manager 110 accesses a set of configuration information 120 (FIG. 1B), including application configuration information 140 (FIG. 1B), from a storage 118 (FIG. 1B), and transforms the configuration information into a set of internal data structures 116(1), including application configuration 146(1) (FIG. 1A). These data structures 116(1) are basically internal server representations of the configuration information 120, which are preprocessed to facilitate access at runtime by various components of the server 106, including the request processing module 108 and the container 114 (FIG. 1A). The manner in which the data structures 116(1) is constructed, and the form that they take within the server 106 will differ from implementation to implementation. As the data structures 116(1) are constructed, they are stored within a portion of the server's memory space. Once construction of the data structures 116(1) is completed and verified, the configuration manager 110 updates the current configuration pointer 112 (which in one embodiment takes the form of a global variable) to point to the memory space occupied by the configuration data structures 116(1), thereby declaring the data structures 116(1) to be the current server configuration. In addition, the configuration manager 110 increments the reference count 130(1) (FIG. 1A) of the data structures 116(1). Once that is done, the server 106 is configured and is ready for operation. At that point, the request processing module 108 may begin establishing connections and servicing requests on those connections using the current configuration pointer 112 and the configuration data structures 116(1).

After the initial set of configuration data structures 116(1) is constructed, the configuration manager 110 enters a monitoring mode wherein it monitors for a signal indicating that the server 106 is to be reconfigured. If no such signal is detected, then the configuration manger 110 loops back to continue checking for the signal. However, if such a signal (e.g. a Unix signal) is received, then the configuration manager 110 proceeds to construct a new set of configuration data structures. In one embodiment, when the reconfiguration signal is sent to the configuration manager 110, a reference to a modified set of configuration information 124 (FIG. 1B), including modified application configuration information 144 (FIG. 1B), is also provided. Using the reference to access the modified configuration information 124 stored in the storage 118, the configuration manager 110 constructs a new set of configuration data structures 116(2) (FIG. 1A) based upon the modified configuration information 124. In one embodiment, the configuration manager 110 constructs the new data structures 116(2) in much the same way as it did the initial set of data structures 116(1), except that the new data structures 116(2) are not constructed as part of a startup procedure.

As the new configuration data structures 116(2) are constructed, they are stored into another portion of the server's memory space. While the new configuration data structures 116(2) are being constructed, the current configuration pointer 112 is not changed. That is, it still points to the initial set of configuration data structures 116(1). As a result, all connections established by the request processing module 108 and all application service requests during construction of the new data structures 116(2) will be associated with the initial set of data structures 116(1), not the new set 116(2).

After the new configuration data structures 116(2) are completely constructed, the configuration manager 110 updates the current configuration pointer 112 to point to the new configuration data structures 116(2). In one embodiment, this update is performed atomically (for example, by using a read/write lock) to prevent other threads from accessing the pointer 112 while it is being updated. After the pointer 112 is updated, the reference count 130(2) (FIG. 1A) of the new data structures 116(2) is incremented, and the reference count 130(1) of the initial set of data structures 116(1) is decremented. Thereafter, the configuration manager 110 checks the value of the reference count 130(1). If the reference count 130(1) indicates that no more connections are relying upon the initial set of data structures 116(1), then those data structures 116(1) are released or destroyed. In one embodiment, the configuration manager 110 releases or destroys the data structures 116(1) by freeing the memory space occupied thereby.

Once the current configuration pointer 112 is updated, the new configuration data structures 116(2) are established as the current server configuration, and are used by the various server 106 components to govern their behavior, and the application configurations 146 are used by the container 114 to govern execution of the applications 150. In this manner, the configuration of the server 106 is changed from one configuration 116(1) to another 116(2) without shutting down and restarting the server 106. Hence, the configuration of any revised applications 150 (FIG. 1A) are also changed from application configuration 146(1) to 146(2). After the change in configuration is completed, the request processing module 108 will associate new connections with the new set of configuration data structures 116(2) rather than the old set 116(1). After the server 106 is reconfigured, the configuration manager 110 loops back to monitor for another reconfiguration signal. In the manner described, the configuration manager 110 reconfigures the server 106, and thus the applications 150, smoothly, efficiently, and without incurring any server down time.

Hardware Overview

In one embodiment, the server 106 of the present invention and its various components are implemented as a set of instructions executable by one or more processors. The invention may be implemented as part of an object oriented programming system, including but not limited to the JAVA™ programming system manufactured by Sun Microsystems, Inc. of Palo Alto, Calif.

Figure 3:
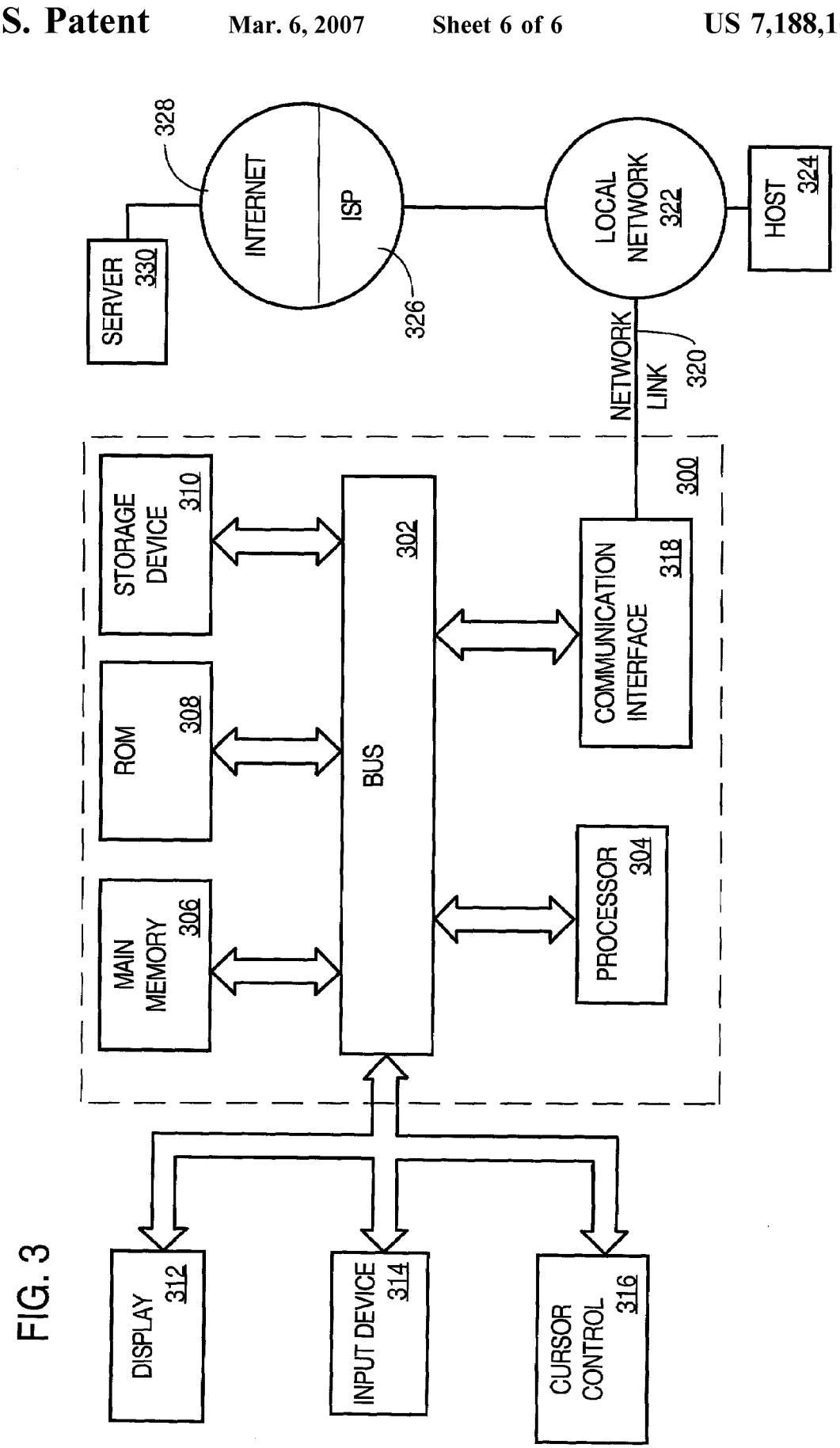
FIG. 3 shows a hardware block diagram of a computer system on which an embodiment of the invention may be implemented.

FIG. 3 shows a hardware block diagram of a computer system 300 in which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory ("RAM") or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory ("ROM") 308 or other static storage device coupled to bus 302 for storing static information and instructions for processor 304. A storage device 310, such as a magnetic disk, optical disk, or magneto-optical disk, is provided and coupled to bus 1002 for storing information and instructions.

Computer system 300 may be coupled via bus 302 to a display 312, such as a cathode ray tube ("CRT") or a liquid crystal display ("LCD"), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for dynamically reconfiguring an application. According to embodiments of the invention, dynamically reconfiguring an application is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical, magnetic, or magneto-optical disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector can receive the data carried in the infrared signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network ("ISDN") card or a modem to provide a data communication connection to a corresponding type of telephone line. As another example, communication interface 318 may be a local area network ("LAN") card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider ("ISP") 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318

Processor 304 may execute the received code as it is received, and/or stored in storage device 310, or other non-volatile storage for later execution. In this manner, computer system 300 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. For example, the invention is described with reference to applications embodied in servlets, with configurations represented in WEB-INF directories, which comprise components including deployment descriptors embodied in web.xml files. However, the techniques described herein are not limited to any specific application architecture, runtime environment, or server platform. The specification and drawings are, accordingly, to be regarded in an illustrative rather than a restrictive sense.

In addition, certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

One extension that can be implemented with the system described herein is a mechanism for comparing application configurations, or configuration constituents, to determine if a configuration has been changed, and if so, in what manner.

What is claimed is:

1. In a computer system on which one or more applications execute, a computer-implemented method for reconfiguring an application without restarting the computer system, comprising:

wherein a first configuration of a particular application is defined by first configuration information, the first configuration information specifying application classes for execution of the particular application according to the first configuration;

reading second configuration information defining a reconfigured version of the particular application, the second configuration information specifying application classes for execution of the particular application according to the reconfigured version of the particular application;

constructing a second configuration of the particular application based on the second configuration information; and providing the second configuration to an application runtime environment for servicing new requests related to the particular application while maintaining the first configuration for servicing, concurrently with the servicing of new requests based on the second configuration, existing requests related to the particular application.

2. The method of claim 1, further comprising:

destroying the first configuration upon completion of all application service requests using the first configuration, whereby computer system resources used to maintain the first configuration are made available for other uses.

3. The method of claim 1, further comprising:

accessing persistent session information related to an existing application user session to use for servicing new requests from the same user during the existing application user session.

4. The method of claim 1, further comprising:

determining that the second configuration successfully initialized prior to providing the second configuration to the runtime environment for servicing new requests.

5. The method of claim 4, wherein the step of determining that the second configuration successfully initialized is based on a communication from the application runtime environment.

6. The method of claim 1, further comprising:

receiving a request to reconfigure the computer system; and reconfiguring the computer system in response to the request.

7. The method of claim 1, wherein constructing the second configuration is further based on an application runtime environment configuration.

8. The method of claim 7 wherein constructing the second configuration includes:

reading a timestamp associated with the second configuration information; and determining that the second configuration information is different than the first configuration information based on the timestamp.

9. The method of claim 1 wherein constructing the second configuration includes:

reading a timestamp associated with a class file referenced in the second configuration information;

determining that the class file has changed based on the timestamp; and constructing the second configuration, at least in part, according to the changed class file.

10. The method of claim 1, further comprising:

logging one or more messages related to providing the second configuration to the computer system.

11. The method of claim 1, wherein providing the second configuration comprises:

updating a current configuration reference to reference the second configuration rather than the first configuration.

12. The method of claim 11, wherein updating the current configuration reference is performed atomically.

13. The method of claim I wherein the first configuration is maintained for servicing, without interruption, existing requests related to the particular application from an existing connection.

14. In a computer system on which one or more applications execute, wherein a former application configuration is defined by a first application configuration information and a current application configuration is defined by a second application configuration information, the application configurations providing for execution of the application, a computer-implemented method for processing application service requests, comprising:

wherein the first application configuration information specifies application classes for execution of the application according to the former application configuration and the second application configuration information specifies application classes for execution of the application according to the current application configuration;

completing processing, based at least in part on the application classes specified in the first application configuration information, a pending first request for an application service that is associated, via a global variable, with the former application configuration;

receiving a second request for an application service;

associating, via a global variable, the second request with the current application configuration;

accessing the second application configuration information defining the current application configuration;

while completing processing the pending first request, processing the second request based at least in part on the application classes specified in the second application configuration information.

15. The method of claim 14 wherein the pending first request and the second request originate from the same user session, and wherein completing processing the pending first request and processing the second request are performed without restarting the computer system.

16. The method of claim 14, further comprising:

determining whether the first application configuration information is referenced by at least one pending process; and deleting the first application configuration information from the computer system in response to determining that the first application configuration information is not referenced by at least one pending process.

17. The method of claim 16, wherein the first application configuration information occupies one or more blocks of memory, and wherein deleting the first application configuration comprises:

releasing the one or more blocks of memory.

18. The method of claim 16, wherein determining whether the first application configuration information is referenced by at least one pending process comprises:

determining whether a reference count is equal to a predetermined value indicating that no processes are referencing the first application configuration information.

19. In a computer system on which one or more applications execute, wherein a plurality of application configurations are defined by a plurality of associated application configuration information and one application configuration of the plurality of application configurations is the current configuration associated with a current version of a first application and two or more other application configurations of the plurality of application configurations are former configurations associated with former versions of the first application, a computer-implemented method for processing application service requests, comprising:

completing processing one or more pending requests for application services that are associated with any of the former configurations according to corresponding former configuration information that is associated with each of the one or more pending requests and that specifies application classes for execution of the application according to a corresponding former configuration, wherein the one or more pending requests are processed based at least in part on the application classes specified in the corresponding former configuration information;

while completing processing the one or more pending requests, receiving a new request for an application service, accessing current application configuration information defining the current configuration and specifying application classes for execution of the application according to the current configuration; and processing the new request based at least in part on the application classes specified in the current application configuration information.

20. In a computer system on which one or more applications execute, a computer-readable medium comprising instructions which, when executed by one or more processors, cause the one or more processors to reconfigure an application without restarting the computer system, by performing the steps of:

wherein a first configuration of a particular application is defined by first configuration information, the first configuration information specifying application classes for execution of the particular application according to the first configuration;

reading second configuration information defining a reconfigured version of the particular application, the second configuration information specifying application classes for execution of the particular application according to the reconfigured version of the particular application;

constructing a second configuration of the particular application based on the second configuration information; and providing the second configuration to an application runtime environment for servicing new requests related to the particular application while maintaining the first configuration for servicing, concurrently with the servicing of new requests based on the second configuration, existing requests related to the particular application.

21. The computer readable medium of claim 20, wherein execution of the instructions by the one or more processors causes the one or more processors to perform:

destroying the first configuration upon completion of all application service requests using the first configuration, whereby computer system resources used to maintain the first configuration are made available for other uses.

22. The computer readable medium of claim 20, wherein execution of the instructions by the one or more processors causes the one or more processors to perform:

accessing persistent session information related to an existing application user session to use for servicing new requests from the same user during the existing application user session.

23. The computer readable medium of claim 20, wherein execution of the instructions by the one or more processors causes the one or more processors to perform:
determining that the second configuration successfully initialized prior to providing the second configuration to the runtime environment for servicing new requests related to the particular application.

24. The computer readable medium of claim 23, wherein execution of the instructions by the one or more processors causes the one or more processors to perform the step of determining that the second configuration successfully initialized based on a communication from the application runtime environment.

25. The computer readable medium of claim 20, wherein execution of the instructions by the one or more processors causes the one or more processors to perform:
receiving a request for reconfiguring the computer system absent any changes to the computer system configuration; and
reconfiguring the computer system based on the second configuration in response to the request.

26. The computer-readable medium of claim 20, wherein constructing a second configuration is based on the second configuration information and an application runtime environment configuration, and wherein execution of the instructions by the one or more processors causes the one or more processors to perform providing the second configuration to the server for servicing new requests related to the particular application according to the second configuration.

27. The computer-readable medium of claim 26 wherein execution of the instructions by the one or more processors causes the one or more processors to perform constructing the second configuration by performing the steps of:
reading a timestamp associated with the second configuration information; and
determining that the second configuration information is different than the first configuration information based on the timestamp.

28. The computer-readable medium of claim 20 wherein execution of the instructions by the one or more processors causes the one or more processors to perform constructing the second configuration by performing the steps of:
reading a timestamp associated with a class file referenced in the second configuration information;
determining that the class file has changed based on the timestamp; and
constructing the second configuration, at least in part, according to the changed class file.

29. The computer readable medium of claim 20, wherein execution of the instructions by the one or more processors causes the one or more processors to perform:
logging one or more messages related to providing the second configuration to the computer system.

30. The computer-readable medium of claim 20 wherein execution of the instructions by the one or more processors causes the one or more processors to perform providing the second configuration by performing the steps of:
updating a current configuration reference to reference the second configuration rather than the first configuration.

31. The computer-readable medium of claim 30 wherein execution of the instructions by the one or more processors causes the one or more processors to perform updating the current configuration reference atomically.

32. In a computer system on which one or more applications execute, wherein a former application configuration is defined by a first application configuration information and a current application configuration is defined by a second application configuration information, the application configurations providing for execution of the application, a computer-readable medium comprising instructions which, when executed by one or more processors, cause the one or more processors to process application service requests, by performing the steps of:
wherein the first application configuration information specifies application classes for execution of the application according to the former application configuration and the second application configuration information specifies application classes for execution of the application according to the current application configuration;
completing processing, based at least in part on the application classes specified in the first application configuration information, a pending first request for an application service that is associated, via a global variable, with the former application configuration;
receiving a second request for an application service;
associating, via a global variable, the second request with the current application configuration;
accessing the second application configuration information defining the current application configuration;
while completing processing the pending first request, processing the second request based at least in part on the application classes specified in the second application configuration information.

33. The computer-readable medium of claim 32 wherein the pending first request and the second request originate from the same user session, and wherein execution of the instructions by the one or more processors causes the one or more processors to perform completing processing the pending first request and processing the second request without having to restart the computer system.

34. The computer-readable medium of claim 32 wherein execution of the instructions by the one or more processors causes the one or more processors to perform the steps of:
determining whether the first application configuration information is referenced by at least one pending process; and
deleting the first application configuration information from the computer system in response to determining that the first application configuration information is not referenced by at least one pending process.

35. The computer-readable medium of claim 34, wherein the first application configuration information occupies one or more blocks of memory, and wherein execution of the instructions by the one or more processors causes the one or more processors to perform deleting the first application configuration by performing:
releasing the one or more blocks of memory.

36. The computer-readable medium of claim 34, wherein execution of the instructions by the one or more processors causes the one or more processors to perform determining whether the first application configuration information is referenced by at least one pending process by performing:
determining whether a reference count associated with the first application configuration information is equal to a predetermined value indicating that no processes are referencing the first application configuration information.

37. The computer readable medium of claim 36, wherein execution of the instructions by the one or more processors causes the one or more processors to perform determining that the second application configuration successfully initialized based on a communication from an application runtime environment.

38. An apparatus on which one or more applications execute, wherein a first application configuration is defined by first application configuration information, the first application configuration providing for execution of the application, the apparatus comprising:

a network interface;

a memory; and one or more processors connected to the network interface and the memory, the one or more processors configured for:

wherein a first configuration of a particular application is defined by first configuration information, the first configuration information specifying application classes for execution of the particular application according to the first configuration;

reading second configuration information defining a reconfigured version of the particular application, the second configuration information specifying application classes for execution of the particular application according to the reconfigured version of the particular application;

constructing a second configuration of the particular application based on the second configuration information; and providing the second configuration to an application runtime environment for servicing new requests related to the particular application while maintaining the first configuration for servicing, concurrently with the servicing of new requests based on the second configuration, existing requests related to the particular application.

* * * * *